United States Patent [19]
Wadle

[11] Patent Number: 5,156,355
[45] Date of Patent: Oct. 20, 1992

[54] WINDING AND UNWINDING APPARATUS INCORPORATING WRAPPING ARMS

[76] Inventor: Ron Wadle, P.O. Box 91, Belleview, Mo. 63623

[21] Appl. No.: 548,255

[22] Filed: Jul. 5, 1990

[51] Int. Cl.[5] ............... B65H 75/40; B65H 57/28; B65H 49/02
[52] U.S. Cl. ............... 242/86.5 R; 242/54 R; 242/158 R; 254/134.3 R; 405/174
[58] Field of Search ............ 242/86.5 R, 54 R, 158 R, 242/82, 85; 405/174; 254/134.3 R

[56] References Cited

U.S. PATENT DOCUMENTS

| | | | |
|---|---|---|---|
| 3,148,863 | 9/1964 | Peterson et al. | 242/54 R |
| 3,371,876 | 3/1968 | Wilcox | 242/82 |
| 3,827,650 | 8/1974 | Stevens et al. | 242/86.5 R |
| 4,047,599 | 9/1977 | Rousseau | 242/86.5 R |
| 4,164,331 | 8/1979 | Henrich | 242/47 |
| 4,324,195 | 4/1982 | Cunningham et al. | 242/54 R |
| 4,871,127 | 10/1989 | Clark | 242/86.5 R |
| 4,934,627 | 6/1990 | MacNeil | 242/54 R |

Primary Examiner—Daniel P. Stodola
Assistant Examiner—John Q. Nguyen
Attorney, Agent, or Firm—Paul M. Denk

[57] ABSTRACT

Apparatus (10) for unwinding a flexible cable (C) from a storage reel (S) on which the cable is wound. The cable is wound onto a take-up drum (50). An arm mechanism (60) engages the cable and wraps it about the drum. A mechanism (64) is provided for continuously rotating the arm mechanism, this rotation unwinding a length of cable from the storage reel at the same time another length of cable is wound onto the take-up drum. In addition, a mechanism (66) is provided for simultaneously moving the arm mechanism longitudinally with respect to the drum for the cable to be wound onto the drum along the entire length thereof.

4 Claims, 4 Drawing Sheets

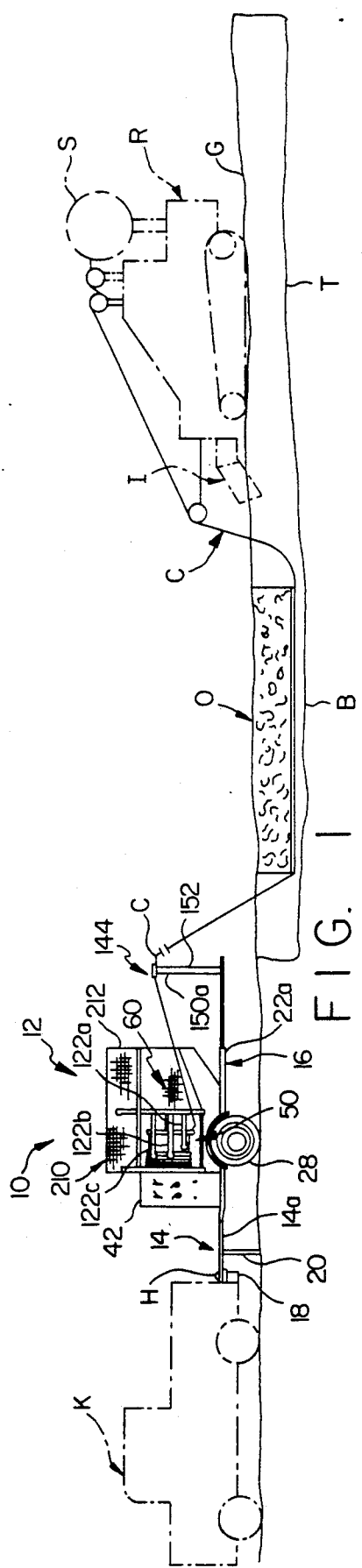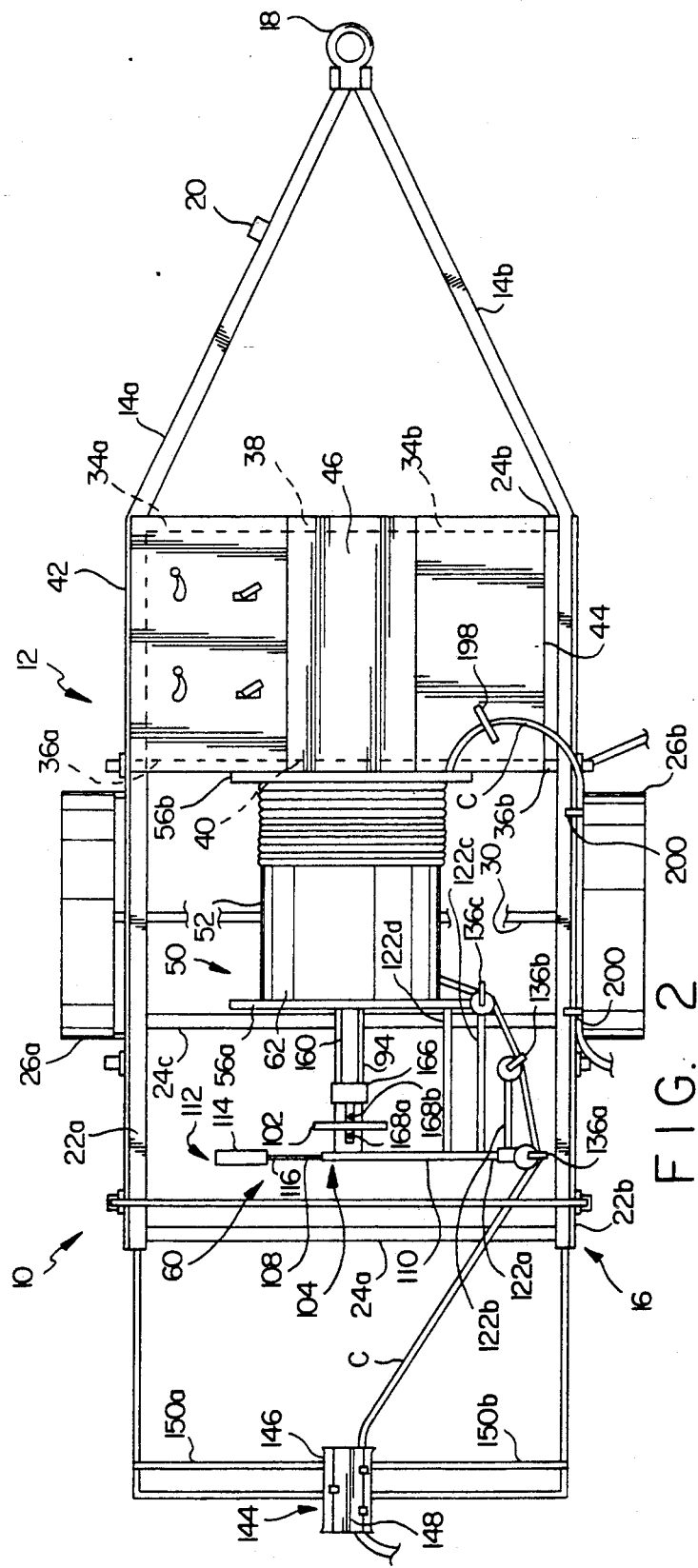

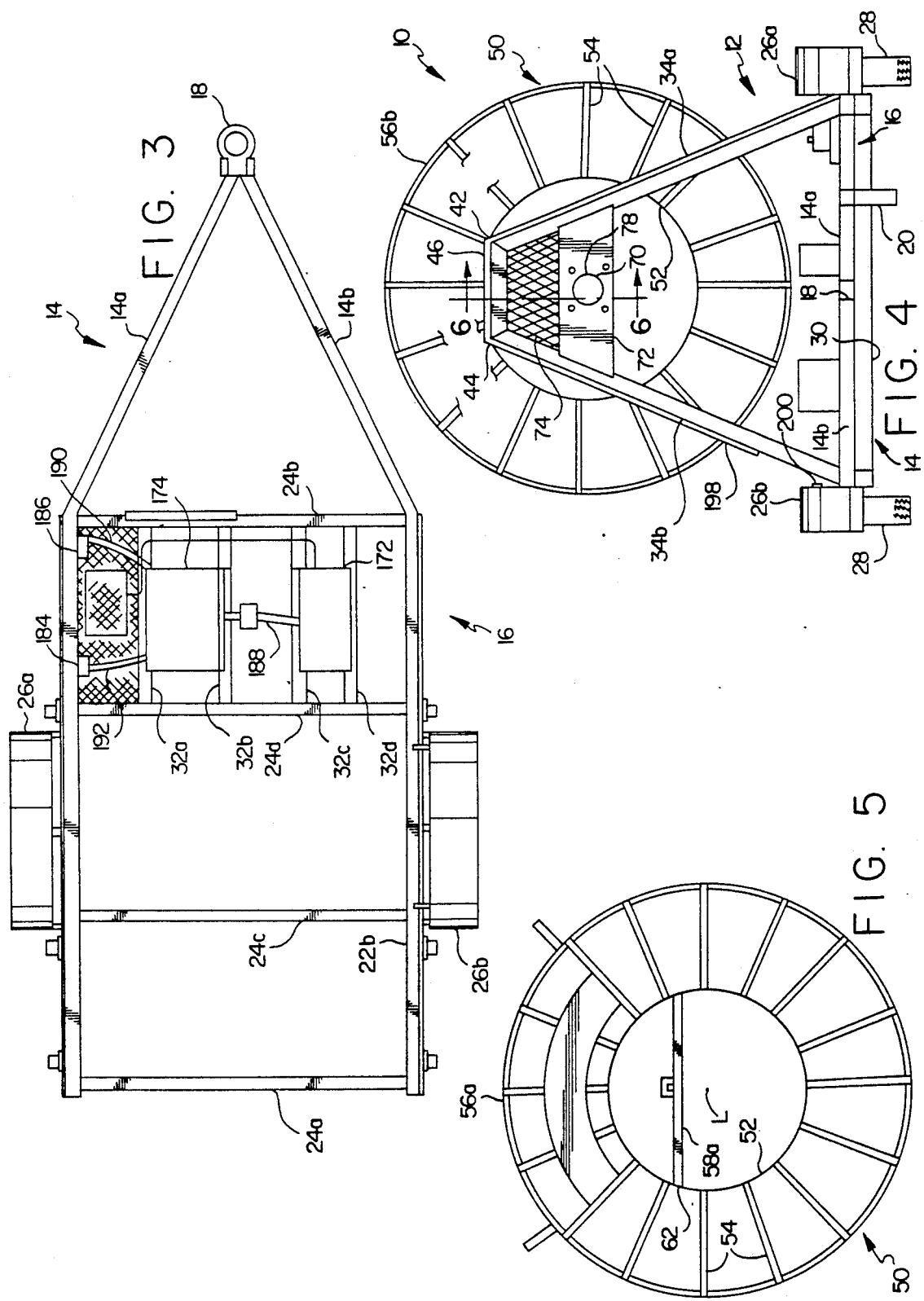

WINDING AND UNWINDING APPARATUS INCORPORATING WRAPPING ARMS

BACKGROUND OF THE INVENTION

This invention relates to the underground laying of cables such as fiber optic cables in which the cable must be unwound from a reel when an obstruction is encountered and then rewound after an end of the cable is fed under or through the obstruction, and more particularly, to apparatus for automatically performing the unwinding operation in a rapid and efficient manner.

A well-known problem in the laying of underground cables, including fiber optic cables, is how to lay the cable under an obstruction. Encountering a roadway or similar obstacle through which a trench could not be conveniently routed, has meant that a tunnel or bore has had to be driven under the obstacle. This further involved the necessity of unwinding the cable from a storage reel, feeding the free end of the cable through the tunnel, and then rewinding the cable back unto the reel on the other side of the obstruction. This operation has involved considerable man-hours of effort and the tortuous laying of cable on the ground in various patterns so that the cable could be more readily rewound.

Different devices for handling cable are known in the art. See, for example, U.S. Pat. Nos. 4,744,696, 4,701,098, 4,568,035, 4,542,861, 4,454,999, 4,447,013, and U.S. Pat. No. 4,338,059. In addition to these, there is also U.S. Pat. No. 4,871,127, which discloses a portable device for storing an endless cable. The device includes a slotted center tube in which the clack end of a cable is installed. The cable is also looped inside a reel and transversely inserted into a bail and snatch blocks. A drum is then rotated and reciprocates such that the cable is wound onto the reel. While the device does alleviate some of the problems described above, including reducing the time and man-hours required to unwind a cable, other apparatus should be available which is simpler to use, and as cost effective. Furthermore, it is a requirement of the shown device that the cable must always be centrally oriented, and threaded through the center of the device to operate.

SUMMARY OF THE INVENTION

Among the several objects of the present invention may be noted the provision of cable unwinding apparatus for in-ground cables such as fiber optic cables which eliminates the need to lay a cable out on the ground when the cable is to be routed through an obstacle; the provision of such apparatus which is portable for movement to a work site at which an obstacle is encountered; the provision of such apparatus by which cable being laid underneath an obstruction can be quickly and easily unwound from a storage reel for the free end of the cable to be routed through the obstruction with the cable then being easily rewound back onto the storage reel; the provision of such apparatus to which the cable is readily attached prior to beginning an unwinding operation; the provision of such apparatus for reciprocally winding the cable on a drum so long lengths of cable can be wound on a compact drum; the provision of such apparatus which is hydraulically operated; and, the provision of such apparatus which requires few people to operate so to substantially save on labor costs.

In accordance with the invention, generally stated, apparatus for unwinding a flexible cable from a storage reel on which the cable is wound comprises a cable drum onto which the cable is wound. The cable is engaged by a series of wrapping arms which wrap the cable about the drum. The wrapping arms are continuously rotated about the drum, this rotation unwinding a length of cable from the reel at the same time another length of cable is wound onto the drum. The wrapping arms are simultaneously moved longitudinally with respect to the drum for the cable to be wound onto the drum along its entire length. Other objects and features will be in part apparent and in part pointed out hereinafter.

BRIEF DESCRIPTION OF THE DRAWINGS

FIG. 1 is side view of the portable apparatus of the present invention in operation;

FIG. 2 is a top view of the apparatus with its protective guard removed;

FIG. 3 is a plan view of the frame of the apparatus;

FIG. 4 is a front end view of the apparatus;

FIG. 5 is view of a cable take-up drum of the apparatus viewed from the rear of the apparatus;

Corresponding reference characters indicate corresponding parts throughout the drawings.

DESCRIPTION OF THE PREFERRED EMBODIMENT

Figure 6:
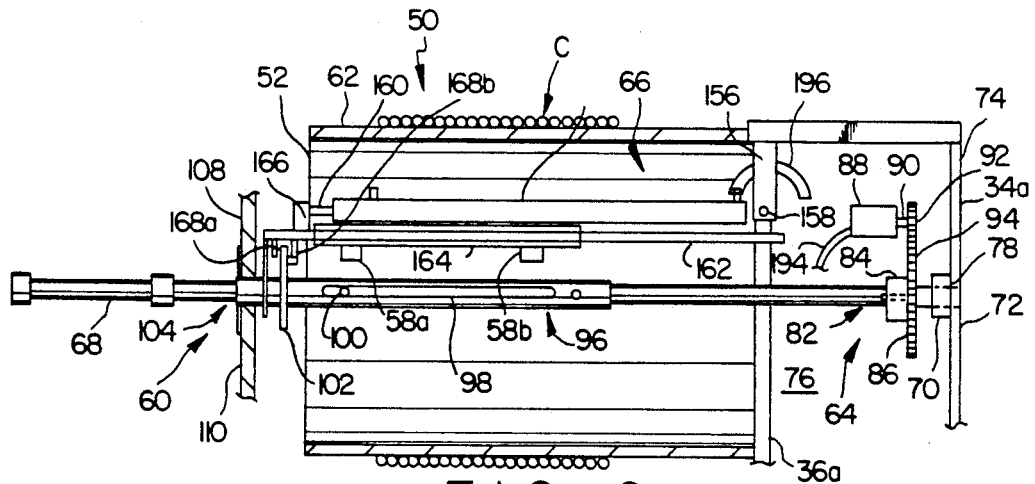
FIG. 6 is a sectional view of the drum, taken along line 6—6 in FIG. 4 and illustrating a portion of the cable wrapping mechanism for winding a cable on the take-up drum.

Referring to the drawings, cable C such as a flexible, fiber optic cable is to be laid in a trench T. Although the description that follows is with regard to cable C, the cable can be any appropriate type of flexible in-ground cable. The depth to which the cable is laid is typically below the frost line to prevent damage to the cable during the winter. While not shown, it will be understood that trench T is created by a cable laying tractor, back hoe, or the like, R having a trenching implement I on its front end creating the furrow in ground G in which the cable is laid. Typically, the tractor also has a cable storage reel S on which the cable was initially wound. Several thousands of feet of cable may be wound on the drum. As the tractor proceeds across the surface, cable is unwound from the reel and deposited in the trench. Thereafter, the cable is covered by the soil displaced as the trench was formed.

Throughout the course of a cable laying operation, an obstacle or obstruction, e.g. roadway O, may be encountered which the trenching implement cannot dig a channel across. When this happens, a tunnel or bore B is created beneath the obstacle. Now, the cable must be unwound from the storage reel. The free end of the cable is then fed through the tunnel and the cable rewound on the reel. Heretofore, this involved unwinding the cable from the reel and laying it out on the ground. The cable typically was laid on the ground in a series of loops or FIG. 8 pattern. When the cable was totally unwound and the end of the cable routed through the tunnel, the cable was rewound on the storage reel so the cable laying process could continue. Such an operation was both time consuming and involved substantial man-hours of effort; especially if there were thousands of feet of cable on the reel. Some improvements have previously been made in simplifying this operation and cutting down on both the labor and time involved. See, for example, U.S. Pat. No. 4,871,127 which presents one alternative to the previous manual methods.

As shown in FIG. 1, apparatus of the present invention, indicated generally 10, comprises a portable, wheeled vehicle 12 which has a tow bar 14 by which the vehicle can be hitched to a powered vehicle such as the truck K and towed along as the cable laying operation moves from place to place. The apparatus includes a generally rectangular frame 16 from which struts 14a, 14b, diagonally, forwardly extend from the respective front corners of the frame to form tow bar 14. A pintle 18 is attached to the forward ends of the struts for connection to a hitch H on the back of truck K. A jack 20 is mounted along the length of strut 14a, when the apparatus is unhitched from truck K, to provide a support leg for the apparatus.

Referring to FIGS. 2-4, it will be seen that frame 16 includes a pair of spaced apart, parallel, side members 22a, 22b. The frame also includes respective end members 24a, 24b, and intermediate lateral support members 24c and 24d. Fenders 26a, 26b are affixed to the respective side members at a point intermediate the length of the side members. Wheels 28 are covered by these fenders and the wheels are mounted on the respective ends of a transversely extending axle 30. Spaced apart, parallel, longitudinal members 32a-32d extend between end member 24b and support member 24d. In addition, struts 34a, 34b angle upwardly and inwardly from the front end of the frame; as do respective parallel struts 36a, 36b. The respective upper ends of the struts are connected by lateral members 38 and 40. The sides of the resulting frame are covered with sheets of metal 42, and 44, as is the top of the frame by a sheet 46. Sheet 42, which comprises a control panel for the apparatus, as will be described hereinafter, extends from the top to the bottom of the struts 34a, 36a. Sheet 44 extends substantially, but not completely, from the top to the bottom of the struts 34b, 36b.

A cable take-up drum 50 comprises a hollow cylinder 52, one end, the forward end of which is attached in any convenient manner to the struts 36a, 36b. The drum may be of any convenient length, it being understood that up to several thousand feet of cable C may be wound about the outer surface of the cylinder. At each end of the drum are a series of radially extending spokes 54 which extend about the circumference of the ends of the drum. Respective bands 56a, 56b extend around the ends of the drum and the outer end of the spokes are attached to the inner face of the bands. The spokes and bands form respective end structures for the take-up drum and define the total diameter of the drum assembly about which the cable can be wound. Again, this may be any convenient diameter capable of permitting long lengths of cable to be wound onto the drum. The drum is rigidly attached to frame 16. A pair of supports 58a, 58b, extend transversely of the cylinder at the rear end of the drum and intermediate the length thereof respectively. The ends of the supports are attached to the inner wall of the cylinder and the supports are installed above the centerline L of the cylinder and parallel to the transverse axis of the cylinder.

An arm means 60 is provided for engaging cable C and wrapping it about the outer surface 62 of cylinder 52. To perform this function and, further, to have the arm wrap the cable along the entire length of the drum, apparatus 10 is also provided with a means 64 for continuously rotating the arm means as well as a means 66 for simultaneously moving the arm means longitudinally with respect to the drum. Means 64 is also designed to move the arm means in a reciprocal manner so the cable is wound over the drum in arranged and uniform layers, one layer of winding being formed when the arm means is moved longitudinally in one direction with respect to the drum and the next layer when the arm means is moved back in the opposite direction. Referring to FIG. 6, a shaft 68, whose length is substantially greater than that of the take-up drum has its forward end journalled in a bearing assembly 70. As shown in FIG. 4, a trapezoidal plate 72 extends between and is attached to struts 34a, 34b. A screen wire mesh 74 is installed above the plate. The side plates 42 and 44, the top plate 46, the plate 72 and the screen thus form a housing 76 immediately forward of the forward end of the drum. The plate has an opening 78 for the forward end of the shaft and the bearing assembly is mounted on the inside surface of the plate inside the housing. A sprocket assembly 82 is mounted to the shaft at point inside the housing. The assembly includes a hub 84 fitting over the shaft and a sprocket 86. A hydraulic drive motor 88 is mounted inside the housing. The motor has an output shaft 90 on the end of which a drive sprocket 92 is mounted. An endless chain 94 is installed over the sprockets for the motor to turn the shaft when the motor is running.

A sleeve 96 is sized to fit on shaft 68 and slide thereover. The length of the sleeve is less than that of the shaft. Opposed longitudinal slots 98, only one of which is shown in FIG. 6, extend intermediate the length of the sleeve. The slots are identical in length and position. Pins 100 are insertable through the slots into the side of shaft 68. The pins serve both to capture the sleeve on the shaft and to limit the distance the sleeve can slide along the shaft. As will be described hereinafter, this determines the distance the arm means can move with respect to the take-up drum. Rearwardly of the rear end of the slots is a circular plate 102 which extends radially outwardly from the side of the sleeve. Rearwardly of the plate is hub assembly 104. This hub assembly comprises a portion of the arm means 60.

Figure 7:
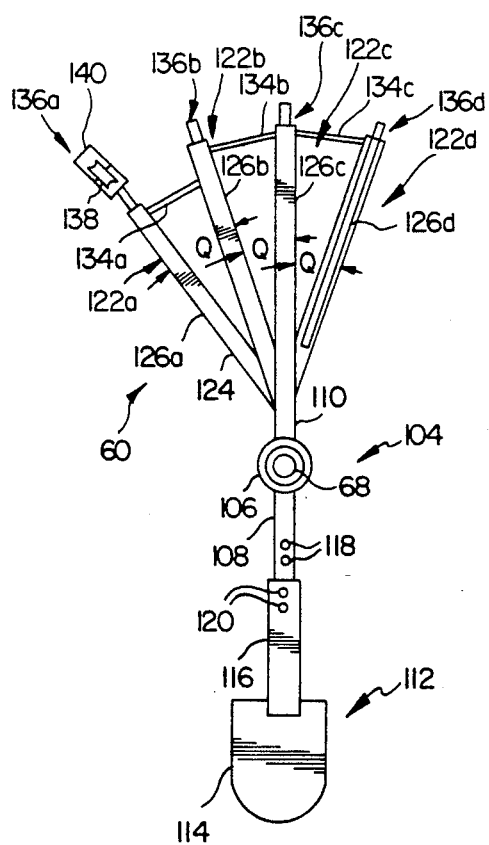
FIGS. 7 and 8 are respective front and side views of an arm mechanism for engaging and wrapping a cable about the take-up drum; and, FIG. 9 is a view of the control panel for operating the apparatus.
Figure 8:
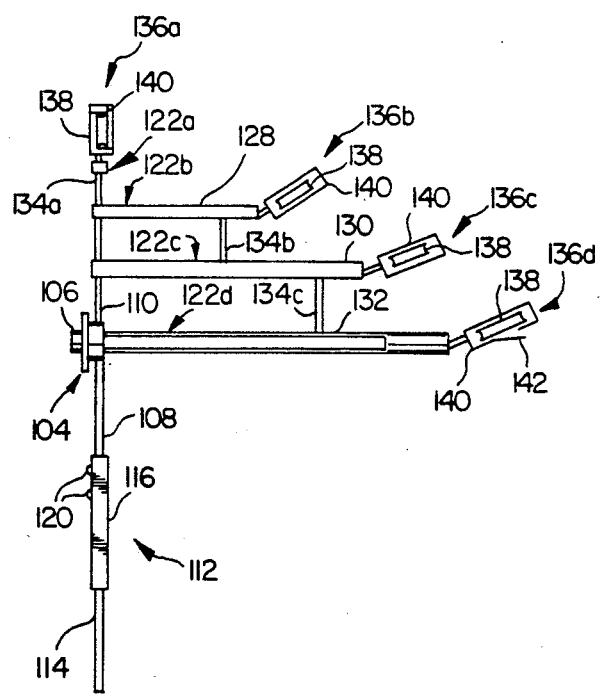

Referring to FIGS. 7 and 8, hub assembly 104 includes a collar 106 which fits over shaft 68 and attaches to the rear end of sleeve 96. For example, the collar is threadably received on the end of the sleeve. Opposed arms 108, 110 extend radially outward from the collar. A counterweight assembly 112 is attached to the outer end of arm 108. Assembly 112 includes a paddle-shaped weight 114 affixed on the end of a hollow arm 116. Arm 116 is rectangular in cross-section and sized to be received on the end of arm 108. Arm 108 has a series of linearly spaced holes 118 and the end of arm 116 fitting onto arm 108 has a pair of corresponding holes. This allows the position of the counterweight on the end of arm 108 to be adjustable. Pins 120 are inserted through the corresponding openings in the arms 116 and 108 when the counterweight assembly is properly positioned.

Arm means 60 includes a plurality or series of spaced apart wrapping arms 122a-122d. It will be understood that there can be more or fewer wrapping arms than the four shown in the drawings. The arms are spaced an angular distance from each other, the angle Q being equal in this instance; although the angle could vary.

Further, the length of the arms becomes increasingly longer from are 122a through arm 122d. It will be noted, however, that arm 122a, the shortest arm, has a length generally corresponding to the radius from the centerline of the take-up drum to the circumference of the bands 56a, 56b. As shown in FIG. 7, arm 122a is comprised of an arm section 124. Arms 122b-122d are each comprised of arm sections 126b-126d all of which are of equal length but longer than section 124. Arms 122b-122d each further comprise a second arm segment 128, 130, and 132 respectively. These second arm sections are located at the respective distal ends of the first arm sections and extend orthogonally thereto. As shown in FIGS. 1 and 2, the sections extend forwardly over the drum and are radially spaced outwardly therefrom. Arm section 130 is longer than section 128; while arm section 132 is longer than section 130. Tie bars 134a-134c interconnect adjacent arms to provide structural rigidity to the assembly. Tie bar 134a extends between arm sections 124 and 126b, tie bar 134b between sections 128 and 130, and tie bar 134c between sections 130 and 132. As best seen in FIG. 8, the tie bars are attached in a staggered arrangement to help improve the rigidity of the assembly.

Respective cable guides 136a-136d are affixed to the respective outer ends of the wrapping arms 122a-122d. Each guide comprises a sheave 138 mounted in a rectangular frame 140. The sheaves are preferably of a low friction elastomeric material to facilitate movement of the cable through the guide. Further, each frame has an openable and closable section 142 (see guide 136d) to facilitate installation of a section of the cable in the respective guides at the beginning of a cable unwinding operation. Section 142 may be of any convenient design which allows the section to be opened for installation of the cable in the guide and which can be thereafter closed and locked in place to prevent inadvertent dislodgement of the cable during the unwinding operation. Each cable guide is arranged at a particular angle as shown, to conveniently direct the cable onto or off of the drum during application.

In addition to the cable guides 136a-136d, at the rear of vehicle 12 is a cable guide 144 (see FIGS. 1 and 2). The guide comprises a short hollow cylinder 146 having an openable and closeable section 148. Again, this section can be of any convenient design which will not inadvertently open during an unwinding operation. Guide 144 is aligned with the longitudinal centerline of drum 50, and is therefore mounted on the upper ends of respective struts 150a, 150b which extend diagonally upwardly from the rear end of respective frame side members 22a, 22b. In addition, a vertical support 152 extends upwardly from end frame member 24a.

To obtain reciprocal longitudinal movement of the wrapping arm assembly, a hydraulic ram or cylinder 154 is mounted within cylinder 52. A support bracket 156 vertically depends from the forward, upper end of the cylinder, and the forward end of the cylinder is attached to this bracket by a pin 158. Hydraulic cylinder 154 extends lengthwise of cylinder 52 at a point above the transverse supports 58a, 58b. A piston rod 160 extends rearwardly from the rear of the hydraulic cylinder. A slide 162 is installed in a guide 164. The guide comprises a hollow tube which is rectangular in cross-section. The guide extends longitudinally of cylinder 52 and the respective ends of the guide are supported on the upper faces of supports 58a, 58b. Further, the guide is parallel to the hydraulic cylinder. The length of slide 162 is approximately the same as the length of the take-up drum. The rear end of the slide is attached to the outer end of piston rod 160 by a connector 166. This connector is a vertically extending bracket which attaches to the outer end of the piston rod, at the upper end of the bracket, and to the rear end of the slide, at the lower end of the bracket. This connection can be achieved in any convenient manner such that as the piston rod moves into and out of the hydraulic cylinder, the slide moves with it. Depending beneath the slide, at the outer end thereof, as a pair of spaced apart pins are bearing members 168a, 168b. As seen in FIG. 6, the spacing between the pins is such that they straddle plate 102 on sleeve 96.

Figure 9:
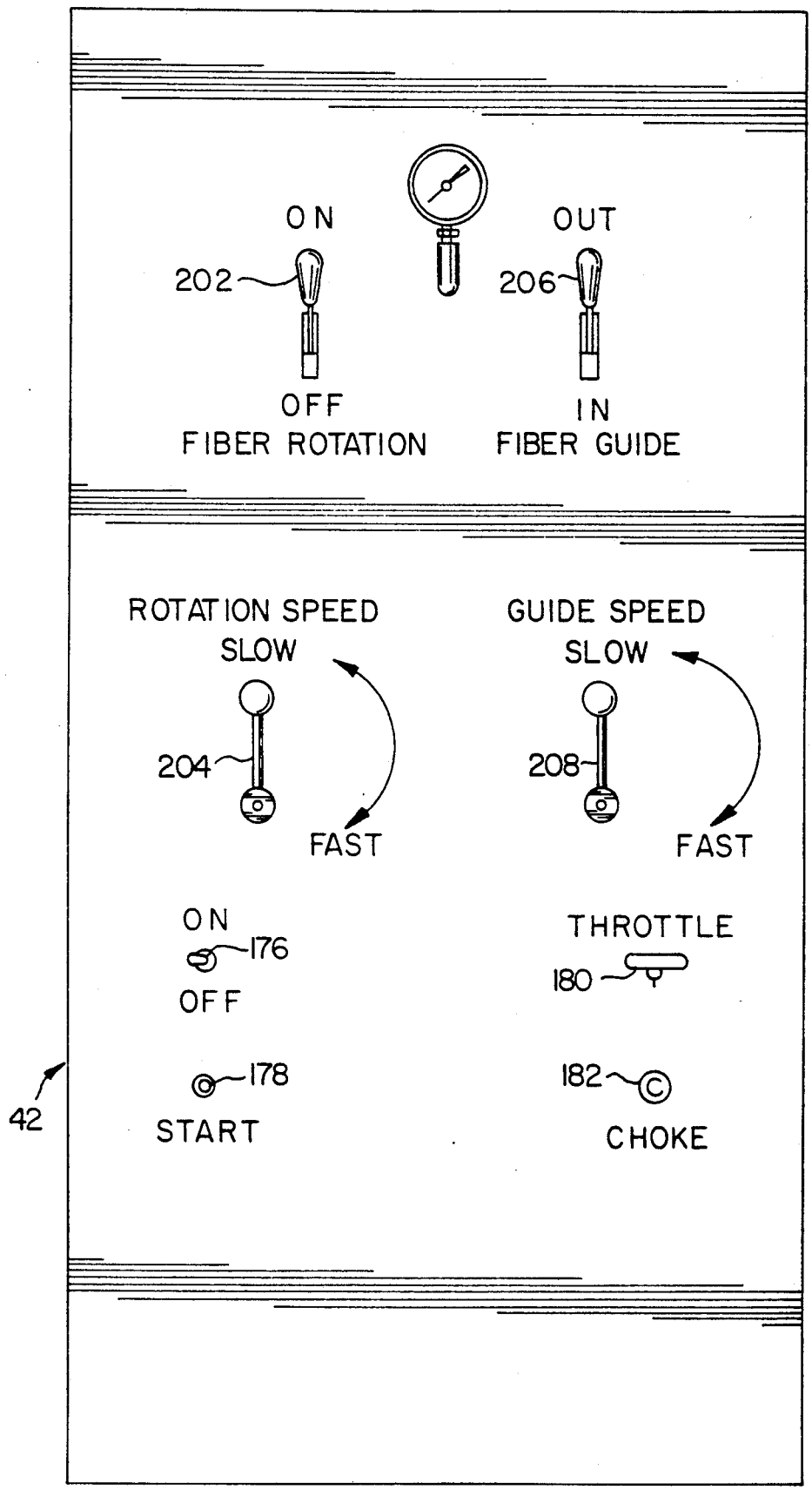

Located beneath housing 76, and installed on the frame members 32a-32d are a battery 170, a gasoline powered hydraulic pump 172, and a hydraulic fluid reservoir 174. Mounted on side panel 42 are controls for operating motor 88 and the pump. Referring to FIG. 9, the various controls mounted on panel 42 are shown. An "On-Off" switch 176, a "Start" switch 178, and throttle and choke controls 180, 182 respectively are used to start the hydraulic pump and supply electrical current to the hydraulic controls 184, 186 mounted behind panel 42 (see FIG. 3). Hydraulic fluid lines 188-196 are routed between the pump, reservoir, controls, drive motor and ram for the apparatus to perform an unwinding operation.

At the beginning of an unwinding operation, truck K backs vehicle 12 up to the location where the cable unwinding operation is to take place. A length of cable is unwound from drum S. The various cable guides 144 and 136a-136d are opened, and the cable is installed in each guide which are then closed. Since there is usually no free end of the cable which could be attached to the take-up drum 50, a length of cable is routed between the spokes 54 at the forward end of the drum and the cable is inserted in a clamp 198 located on side panel 44. To further secure this section of the cable, it can further be routed through hooks 200 located on the inner face of fender 26b. This insures there will be no interference during the unwinding operation. Once the cable is installed in the various guides and a length clamped in place, the operator moves handle 202 on panel 42 to the "On" position. This activates hydraulic drive motor 88 to begin rotation of shaft 68 and, in turn, arm means 60. By rotating crank 204 on panel 42, the operator can speed up or slow down the rotation of the arm means.

As arm means 60 rotates, cable is wrapped around take-up drum 50 and simultaneously unwound from reel S. Since the arm means rotates completely about drum 50, cable is wrapped completely about the drum. Because the cable is clamped in place by clamp 200, rotation of the arm means creates a pulling action by which the cable is unwound from reel S. It is then drawn through guide 144 and pulled successively outwardly from the center of the apparatus by the movement of the arms 122a-122d. From the outermost arm 122d, the cable is deposited on the outer surface 62 of the take-up drum.

If only a small length of cable is to be unwound and wrapped onto the drum 50, the longitudinal position of the arm means relative to the take-up drum can remain stationary. Where, however, a substantial length of cable is to be wrapped, it is preferable if the cable were wrapped onto the drum in layers. To accomplish this, the moving means 66 is activated to move the arm means longitudinally of the drum simultaneously with its rotation about the drum. The operator accomplishes this by moving lever 206 on panel 42 between the "In" and "Out" positions. Setting the lever to the "Out" position causes hydraulic fluid to be pumped into cylinder 154 to push the piston 160 to the left as viewed in FIG. 6. This moves arm means 60 also to the left, via the force of the piston on plate 102 via slide 162, so the cable is succeedingly deposited over the leftward or rearward portions of the take-up drum. When the cable is being deposited on the extreme rear portion of the drum, the operator moves lever 206 to the "In" position. Now piston 160 is drawn back into the cylinder and the arm means is moved to the right; again, by the force of the piston on plate 102 via slide 162. As the arm means now moves to the right, a new layer of cable is wrapped about the drum over the previously wrapped layers. The operator can also control the speed of this reciprocal movement of the arm means by adjusting the position of a crank 208 on panel 42. When the cable is completely unwound, so the end of the cable is now wrapped on the take-up drum, tractor R is moved to the other side of the obstacle. The end of the cable is now rerouted through the guides 136a-136d and 144 and connected to the reel S. The cable can now be pulled through the tunnel or bore beneath the obstacle and unwound from the take-up drum back onto the reel using the arm means to perform the unwinding operation.

It will be understood that variations on the above components comprising apparatus 10 could be included without effecting the overall operation of the apparatus as described. For example, vehicle 12 could be a powered vehicle and not have to be hitched to another vehicle for movement from one place to another. Also, the arm rotating means 64 and arm moving means 66 could be electrically rather than hydraulically driven. Further, rather than having the operator control the longitudinal movement of the arm means, a sensing means such as an optical sensor could be located inside cylinder 52, at each end of the cylinder. The sensors would detect the position of slide 162 and when the location of the slide indicated the arms means had reached the nearest or farthest end of its travel, the direction of movement could be automatically reversed. In addition, apparatus 10 has a protective guard 210 comprising a wire mesh screen formed in a semi-circular pattern and attached to a frame 212 that is attachable to frame 12. The guard could, instead be of a translucent sheet material or otherwise fabricated so as to permit the operator a clear view of the operation of the apparatus while safeguarding him and any other persons in the vicinity of the apparatus.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. Apparatus for winding/unwinding a flexible cable onto/from a storage reel on which the cable is wound wherein neither end of the cable is accessible, comprising:

a stationary cable take-up drum onto which the cable is wound, said drum having an end normally facing the storage reel during a cable winding/unwinding operation; arm means for engaging the cable and wrapping it about the drum, said arm means operatively associated within the drum and extending from the end facing the storage reel;

means for continuously rotating the arm means, said rotation unwinding/winding a length of cable from/onto a storage reel at the same time another length of cable is wound/unwound onto/from the drum;

means for simultaneously moving the arm means longitudinally with respect to the drum for the cable to be uniformly wound/unwound onto/from the drum along the entire length thereof;

the arm means being located at that end of the drum facing the reel during the operation of the apparatus, and the moving means includes means arranged within the drum for reciprocally moving the arm means away from and towards said end of the drum;

the drum comprising a hollow cylinder around the outside of which the cable is wound, and the arm means includes a shaft extending longitudinally within the cylinder, said shaft being positioned internally of the cylinder and axially aligned with the longitudinal axis thereof;

the rotating means includes means for rotating the shaft;

the arm means further including a sleeve fitting over an outer end of the shaft, both said sleeve and shaft extending outwardly of the drum at that end facing the reel to attain movement during operation of the apparatus, and said shaft capable of turning while simultaneously allowing shifting of the sleeve concentrically and longitudinally upon the shaft to provide for the continuously rotating of the arm means for winding/unwinding of a length of cable onto/from the storage reel uniformly from/onto the drum with respect to the entire length of the drum;

said arm means further includes a series of spaced apart wrapping arms by which the cable is wrapped around the drum, each wrapping arm extends radially outwardly from the outer end of the sleeve, each of the wrapping arms having a common connection point to the sleeve and being angularly offset from each other, and each wrapping arm having a cable guide attached to its distal end and through which the cable is routed, each guide having latch means for latching the cable in the guide.

2. The apparatus of claim 1 wherein the wrapping arms have progressively longer lengths as the cable is guided from a first wrapping arm in the series successively through the remainder of the wrapping arms, and at least one of the wrapping arms has a first section extending radially outwardly from the sleeve a distance greater than the radius of the drum, and a second section orthogonal to the first and extending longitudinally of the drum and parallel to the outer surface thereof.

3. The apparatus of claim 2 wherein a plurality of the wrapping arms have first and second sections, the length of the second section of the longest of said wrapping arms corresponding substantially to the length of the drum.

4. The apparatus of claim 1 further including a counterweight extending radially outwardly from the sleeve opposite from the location of extension of the wrapping arms from the sleeve.

* * * * *